(12) United States Patent
Nakagawa et al.

(10) Patent No.: US 11,489,347 B2
(45) Date of Patent: Nov. 1, 2022

(54) MANAGEMENT DEVICE AND ELECTRICITY STORAGE SYSTEM

(71) Applicant: SANYO Electric Co., Ltd., Daito (JP)

(72) Inventors: Yousuke Nakagawa, Hyogo (JP); Masanori Ito, Hyogo (JP); Masato Nakayama, Hyogo (JP); Hidetsugu Mukae, Hyogo (JP)

(73) Assignee: SANYO Electric Co., Ltd., Daito (JP)

( * ) Notice: Subject to any disclaimer, the term of this patent is extended or adjusted under 35 U.S.C. 154(b) by 122 days.

(21) Appl. No.: 16/977,602

(22) PCT Filed: Nov. 16, 2018

(86) PCT No.: PCT/JP2018/042375
§ 371 (c)(1),
(2) Date: Sep. 2, 2020

(87) PCT Pub. No.: WO2019/171662
PCT Pub. Date: Sep. 12, 2019

(65) Prior Publication Data
US 2020/0412134 A1 Dec. 31, 2020

(30) Foreign Application Priority Data
Mar. 8, 2018 (JP) .............................. JP2018-041666

(51) Int. Cl.
H02J 7/00 (2006.01)
(52) U.S. Cl.
CPC ...... H02J 7/0016 (2013.01); H02J 7/007192 (2020.01); H02J 7/0014 (2013.01); H02J 7/007182 (2020.01); H02J 2207/50 (2020.01)

(58) Field of Classification Search
CPC .................. H02J 7/0016; H02J 7/007192
(Continued)

(56) References Cited

U.S. PATENT DOCUMENTS 7,609,030 B2 * 10/2009 Uesugi .................. H02J 7/0016
320/122
7,612,534 B2 * 11/2009 Morita .................. H02J 7/0016
320/132

(Continued)

FOREIGN PATENT DOCUMENTS

JP 2007-287416 A 11/2007
JP 2008-067460 A 3/2008

(Continued)

OTHER PUBLICATIONS

International Search Report dated Jan. 8, 2019, issued in counterpart Application No. PCT/JP2018/042375. (1 pages).

Primary Examiner — John T Trischler
(74) Attorney, Agent, or Firm — WHDA, LLP

(57) ABSTRACT

A voltage measurement unit measures voltages of the plurality of cells connected in series. A plurality of discharge circuits are connected in parallel to the plurality of cells, respectively. A controller controls, based on the voltages of the plurality of cells detected by voltage measurement unit, the plurality of discharge circuits to make the voltages or capacities of the plurality of cells equal to a target value. The controller determines a number of cells to be discharged among the plurality of cells in accordance with an allowable temperature of a substrate having the plurality of discharge circuits.

4 Claims, 8 Drawing Sheets

(58) Field of Classification Search
USPC .......................................................... 320/118
See application file for complete search history.

(56) References Cited

U.S. PATENT DOCUMENTS

| | | | | |
|---|---|---|---|---|
| 7,956,580 | B2* | 6/2011 | Sugimoto | H02J 7/0016 320/132 |
| 8,350,529 | B2* | 1/2013 | Loncarevic | H02J 7/0016 320/122 |
| 8,405,356 | B2* | 3/2013 | Nakayama | G01R 31/367 320/132 |
| 8,808,886 | B2* | 8/2014 | Kim | H02J 7/0016 338/68 |
| 8,878,491 | B2* | 11/2014 | Shimizu | H02J 7/0016 320/120 |
| 8,941,355 | B2* | 1/2015 | Kamata | H02J 7/0016 320/118 |
| 8,952,660 | B2* | 2/2015 | Zhang | H01M 10/4207 320/134 |
| 9,053,869 | B2* | 6/2015 | Kleffel | H01G 11/10 |
| 9,071,056 | B2* | 6/2015 | Yang | H02J 7/0016 |
| 9,142,981 | B2* | 9/2015 | Kamata | B60L 58/22 |
| 9,184,602 | B2* | 11/2015 | Kim | H02J 7/00 |
| 9,302,595 | B2* | 4/2016 | Tabatowski-Bush | B60L 58/10 |
| 9,350,177 | B2* | 5/2016 | Ohmori | H01M 10/486 |
| 9,356,452 | B2* | 5/2016 | Steck | H02J 7/0016 |
| 9,403,443 | B2* | 8/2016 | Loftus | B60L 58/22 |
| 9,461,495 | B2* | 10/2016 | Kim | H02J 7/0048 |
| 9,660,462 | B2* | 5/2017 | Jeon | H02J 7/0031 |
| 9,746,525 | B2* | 8/2017 | Kudo | B60L 3/0046 |
| 10,063,068 | B1 | 8/2018 | McCormick | G01R 31/396 |
| 10,291,038 | B2* | 5/2019 | Mei | H01M 10/052 |
| 10,451,679 | B2* | 10/2019 | Jeon | H02J 7/0021 |
| 10,576,844 | B2* | 3/2020 | Kim | B60K 1/04 |
| 10,608,294 | B2* | 3/2020 | Sasaki | H02J 7/007194 |
| 10,656,209 | B2* | 5/2020 | Jeon | H02J 7/0021 |
| 10,680,448 | B2* | 6/2020 | Yano | H02J 7/0047 |
| 10,700,536 | B2* | 6/2020 | Kubota | H02J 7/0047 |
| 10,797,491 | B2* | 10/2020 | Sasaki | H01M 10/637 |
| 10,840,711 | B2* | 11/2020 | Hong | G01R 31/36 |
| 10,903,667 | B2* | 1/2021 | Kitagawa | G01R 31/396 |
| 11,101,668 | B2* | 8/2021 | Hidaka | H02J 7/0016 |
| 11,180,032 | B2* | 11/2021 | Nishikawa | B60L 50/60 |
| 2006/0043934 | A1* | 3/2006 | Sugimoto | H02J 7/0016 320/132 |
| 2006/0238165 | A1* | 10/2006 | Moore | H02J 7/0016 320/118 |
| 2007/0247117 | A1* | 10/2007 | Morita | H02J 7/0016 320/132 |
| 2010/0052615 | A1* | 3/2010 | Loncarevic | H02J 7/0016 320/118 |
| 2010/0253285 | A1* | 10/2010 | Takahashi | H02J 7/00038 320/134 |
| 2011/0210700 | A1* | 9/2011 | Shimizu | H02J 7/0021 320/116 |
| 2011/0313613 | A1* | 12/2011 | Kawahara | B60L 58/15 320/134 |
| 2012/0094151 | A1* | 4/2012 | Kim | H02J 7/0016 429/61 |
| 2012/0105014 | A1* | 5/2012 | Nakayama | G01R 31/367 702/63 |
| 2012/0119705 | A1* | 5/2012 | Eberhard | H02J 7/0016 320/135 |
| 2012/0133330 | A1* | 5/2012 | Kamata | H02J 7/0016 320/118 |
| 2012/0139495 | A1* | 6/2012 | Nortman | H02J 7/0016 320/128 |
| 2013/0033231 | A1* | 2/2013 | Zhang | H02J 7/0016 320/116 |
| 2013/0088202 | A1* | 4/2013 | Kamata | H02J 7/0016 320/126 |
| 2013/0113280 | A1* | 5/2013 | Yang | H02J 7/0016 307/19 |
| 2014/0042977 | A1* | 2/2014 | Kim | H02J 7/0068 320/134 |
| 2014/0210415 | A1* | 7/2014 | Ohmori | H01M 10/443 320/118 |
| 2014/0225622 | A1* | 8/2014 | Kudo | B60L 58/13 324/433 |
| 2014/0285151 | A1* | 9/2014 | Steck | H02J 7/0016 320/116 |
| 2015/0002083 | A1* | 1/2015 | Nakao | H02J 7/0016 320/107 |
| 2015/0008887 | A1* | 1/2015 | Kim | H02J 7/0048 320/136 |
| 2015/0035495 | A1* | 2/2015 | Yoshida | H01M 10/482 320/134 |
| 2015/0197163 | A1* | 7/2015 | Loftus | B60K 6/28 320/134 |
| 2015/0244192 | A1* | 8/2015 | Dauchy | H02J 7/0029 320/152 |
| 2015/0349547 | A1* | 12/2015 | Jeon | H02J 7/0021 320/134 |
| 2015/0349550 | A1* | 12/2015 | Jeon | B60L 58/22 320/134 |
| 2016/0056655 | A1* | 2/2016 | Kaneda | H02J 7/0016 320/136 |
| 2016/0190829 | A1* | 6/2016 | Mei | H01M 4/5825 320/112 |
| 2017/0234932 | A1* | 8/2017 | Jeon | H02J 7/0031 320/134 |
| 2018/0009328 | A1* | 1/2018 | Hinterberger | H01M 50/502 |
| 2018/0145520 | A1* | 5/2018 | Sasaki | H01M 10/633 |
| 2018/0151919 | A1* | 5/2018 | Sasaki | H02J 7/02 |
| 2019/0052098 | A1* | 2/2019 | Hong | H01M 10/425 |
| 2019/0074699 | A1* | 3/2019 | Yano | H02J 1/102 |
| 2019/0103749 | A1* | 4/2019 | Kubota | H02J 7/0016 |
| 2019/0135128 | A1* | 5/2019 | Kim | B60L 1/02 |
| 2019/0181658 | A1* | 6/2019 | Kitagawa | G01R 31/3835 |
| 2019/0280489 | A1* | 9/2019 | Hidaka | H02J 7/0016 |
| 2020/0003842 | A1* | 1/2020 | Nishikawa | B60L 58/10 |
| 2020/0025829 | A1* | 1/2020 | Jeon | H02J 7/0029 |
| 2021/0044129 | A1* | 2/2021 | Sasaki | G01K 1/14 |
| 2021/0234378 | A1* | 7/2021 | Nakayama | H02J 7/0016 |
| 2021/0234379 | A1* | 7/2021 | Nakayama | H02J 7/0047 |
| 2021/0296911 | A1* | 9/2021 | Itakura | B60L 3/0046 |
| 2021/0305817 | A1* | 9/2021 | Hidaka | H02J 7/0016 |
| 2021/0320505 | A1* | 10/2021 | Kunimitsu | H01M 50/51 |

FOREIGN PATENT DOCUMENTS

| | | | |
|---|---|---|---|
| JP | 2015-041513 A | 3/2015 | |
| JP | 6242516 B1 | 12/2017 | |
| KR | 101473324 B1 * | 12/2014 | |
| WO | 2013/021589 A1 | 2/2013 | |
| WO | WO-2015128190 A1 * | 9/2015 | .......... B60L 11/1866 |

* cited by examiner

MANAGEMENT DEVICE AND ELECTRICITY STORAGE SYSTEM

TECHNICAL FIELD

The present invention relates to a management device and an electricity storage system that manage states of a plurality of cells connected in series.

BACKGROUND ART

In recent years, hybrid vehicles (HV), plug-in hybrid vehicles (PHV), and electric vehicles (EV) have become popular. These vehicles have secondary batteries as a key device. Examples of the in-vehicle secondary batteries often mainly include a nickel-metal-hydride battery and a lithium-ion battery. Use of lithium-ion batteries having high energy density is expected to spread faster and faster in the future.

Generally, an equalizing process is performed on the lithium-ion batteries to equalize voltages among a plurality of cells connected in series, from a viewpoint of maintaining power efficiency and ensuring safety. A dominant inter-cell equalizing process is a passive balancing method. In the passive balancing method, a voltage of a cell having a lowest voltage among the plurality of cells connected in series is set as a target value, to which the other cells are discharged. The equalizing process by the passive balancing method causes heat generation of a circuit substrate due to the discharge. Meanwhile, use of high heat-resistant parts would increase a cost. Hence, it is conceivable to reduce a discharge current during large heat generation to suppress the heat generation for protecting elements on the circuit substrate (for example, see PTL 1).

CITATION LIST

Patent Literature

PTL 1: International Publication No. 2013/021589

SUMMARY OF THE INVENTION

However, reduction in a discharge current for suppressing the heat generation makes time for equalization to complete (hereinafter, referred to as equalization time) longer. In recent years, in vehicle applications, battery capacity has been increasing to improve a cruising range. Equalization time for the large capacity batteries is originally long. Thus, it is undesirable that the reduction in the discharge current further increases the equalization time.

The present invention has been made in view of these circumstances, and an object of the present invention is to provide a technique for lowering a peak temperature of a substrate while suppressing an increase in equalization time in an equalizing process among a plurality of cells.

In order to solve the above problems, a management device according to an aspect of the present invention includes a voltage measurement unit configured to measure voltages of a plurality of cells connected in series, a plurality of discharge circuits each connected in parallel to each of the plurality of cells, and a controller configured to control, based on the voltages of the plurality of cells detected by the voltage measurement unit, the plurality of discharge circuits to make the voltages or capacities of the plurality of cells equal to a target value. The controller is configured to determine a number of cells to be discharged among the plurality of cells in accordance with an allowable temperature of a substrate having the plurality of discharge circuits.

According to the present invention, it is possible to lower a peak temperature of a substrate while suppressing an increase in equalization time in an equalizing process among a plurality of cells.

DESCRIPTION OF EMBODIMENTS

Figure 1:
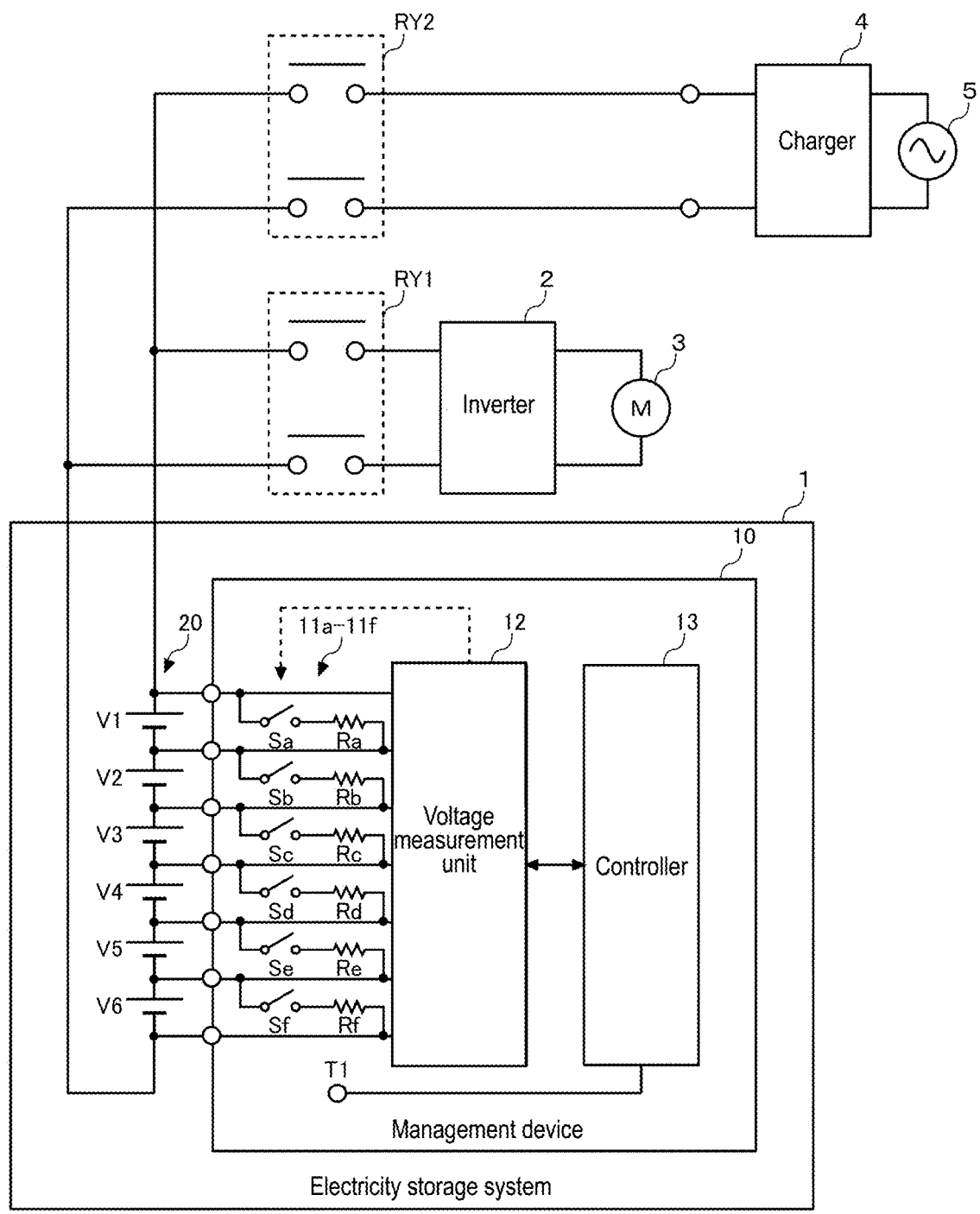
FIG. 1 is a diagram for explaining an electricity storage system according to a first exemplary embodiment of the present invention.

FIG. 1 is a diagram for explaining electricity storage system 1 according to a first exemplary embodiment of the present invention. FIG. 1 shows an example in which electricity storage system 1 according to the first exemplary embodiment is mounted in a vehicle as a battery for driving the vehicle. As the vehicle, an EV/plug-in hybrid electric vehicle (PHEV) that is rechargeable from a commercial power system (hereinafter, simply referred to as system 5) is assumed.

Electricity storage system 1 is connected to motor 3 via first relay RY1 and inverter 2. During power running, inverter 2 converts direct current (DC) power supplied from electricity storage system 1 into alternating current (AC) power to supply motor 3. During regeneration, inverter 2 converts AC power supplied from motor 3 into DC power to supply electricity storage system 1. Motor 3 is a three-phase AC motor and, during power running, rotates in accordance with the AC power supplied from inverter 2. During regeneration, motor 3 converts rotational energy due to deceleration into AC power to supply inverter 2.

First relay RY1 is inserted in wiring between electricity storage module 20 of electricity storage system 1 and inverter 2. When the vehicle is running, management device 10 of electricity storage system 1 controls first relay RY1 to be in an on state (closed state), and electrically connects electricity storage module 20 and the power system of the vehicle. When the vehicle is not running, management device 10 controls first relay RY1 to be in an off state (open state) in principle, and electrically disconnects electricity storage module 20 and the power system of the vehicle. Instead of the relay, another type of switch such as a semiconductor switch may be used.

Electricity storage system 1 can be charged from system 5 by connecting to charger 4 installed outside the vehicle via a charging cable. Charger 4 is installed in homes, car dealers, service areas, commercial facilities, public facilities, and the like. Charger 4 is connected to system 5 and charges electricity storage system 1 in the vehicle via the charging cable. The vehicle includes second relay RY2 inserted in wiring between electricity storage system 1 and charger 4. Instead of the relay, another type of switch such as a semiconductor switch may be used. Management device 10 controls second relay RY2 to be in an on state (closed state) before a start of charging, and to be in an off state (open state) after completion of charging.

Generally, normal charging is performed with AC and rapid charging is performed with DC. When charging is performed with AC, AC power is converted into DC power by an AC/DC converter (not shown) inserted between second relay RY2 and electricity storage system 1.

Electricity storage system 1 includes electricity storage module 20 and management device 10. Electricity storage module 20 is constituted by a plurality of cells V1 to V6 connected in series. As the cell, a lithium-ion battery cell, a nickel-metal-hydride battery cell, a lead battery cell, an electric double-layer capacitor cell, a lithium-ion capacitor cell, or the like can be used. Hereinafter, the present specification assumes an example using lithium-ion battery cells (nominal voltage: 3.6 V to 3.7 V). Note that FIG. 1 illustrates a configuration example in which six cells V1 to V6 are connected in series, but in reality, a larger number of cells are connected in series in accordance with a driving voltage of motor 3.

Management device 10 includes a plurality of discharge circuits 11a to 11f, voltage measurement unit 12, and controller 13. The plurality of discharge circuits 11a to 11f and voltage measurement unit 12 are installed on a single substrate (hereinafter, a general printed wiring substrate is assumed). Each node of the plurality of cells V1 to V6 connected in series and a corresponding connector on the substrate are connected via a wire harness. Each connector on the substrate and a corresponding analog input port of voltage measurement unit 12 are connected via a voltage line (printed wiring).

Voltage measurement unit 12 measures voltages of respective cells V1 to V6 by measuring voltages between two adjacent voltage lines among a plurality of the voltage lines. Voltage measurement unit 12 transmits the measured voltages of respective cells V1 to V6 to controller 13.

The plurality of discharge circuits 11a to 11f are respectively connected in parallel to the plurality of cells V1 to V6. The plurality of discharge circuits 11a to 11f each include discharge resistor Ra to W and discharge switch Sa to Sf that are connected in series. Discharge switch Sa to Sf is consisted by, for example, a semiconductor switch.

Temperature sensor T1 is installed near the plurality of discharge circuits 11a to 11f. As temperature sensor T1, for example, a thermistor can be used. Temperature sensor T1 measures a temperature of the substrate on which temperature sensor T1 is installed and outputs the temperature to controller 13. Although only one temperature sensor T1 is illustrated in FIG. 1, a plurality of temperature sensors may be installed. Especially when a number of discharge circuits is large, it is preferable to install a plurality of temperature sensors.

Voltage measurement unit 12 can be constituted by a general-purpose analog front-end integrated circuit (IC) or an application specific integrated circuit (ASIC). Voltage measurement unit 12 includes a multiplexer and an analog to digital (A/D) converter. The multiplexer outputs the voltages between two adjacent voltage lines to the A/D converter sequentially from top. The A/D converter converts an analog voltage input from the multiplexer into a digital value. Voltage measurement unit 12 has a high voltage with respect to controller 13, and thus is connected to controller 13 via a communication line in an insulated state.

Although not shown in FIG. 1, a current measurement unit for measuring currents flowing in the plurality of cells V1 to V6 and a cell temperature measurement unit for measuring temperatures of the plurality of cells V1 to V6 are included.

Controller 13 manages electricity storage module 20 based on the voltages, currents, and temperatures of the plurality of cells V1 to V6 measured by voltage measurement unit 12, the current measurement unit (not shown), and the cell temperature measurement unit (not shown). Controller 13 can be constituted by a microcomputer and a non-volatile memory (for example, electrically erasable programmable read-only memory (EEPROM) or flash memory). Controller 13 may be installed on the above-mentioned substrate or may be installed on another substrate. In a case of a large-scale system, voltage measurement unit 12 and controller 13 may be sometimes installed on separate substrates.

Controller 13 estimates a state of charge (SOC) and a state of health (SOH) of each of the plurality of cells V1 to V6. The SOC can be estimated by an open circuit voltage (OCV) method or a current integration method. The OCV method is a method of estimating a SOC based on an OCV of each cell V1 to V6 measured by voltage measurement unit 12 and characteristic data of a SOC-OCV curve stored in the non-volatile memory. The current integration method is a method of estimating a SOC based on an OCV of each cell V1 to V6 at a start of charging/discharging measured by voltage measurement unit 12 and an integrated value of a current measured by the current measurement unit (not shown).

The SOH is defined as a ratio of current full charge capacity to initial full charge capacity, and indicates that the lower (the closer to 0%) the value, the more degradation progresses. The SOH may be obtained by measuring the capacity through full charging/discharging, or may be obtained by adding storage degradation and cycle degradation. The storage degradation can be estimated based on a SOC, a temperature, and a storage degradation rate. The cycle degradation can be estimated based on a SOC range in use, a temperature, a current rate, and a cycle degradation rate.

The SOH can also be estimated based on a correlation with internal resistance of the cell. The internal resistance can be estimated by dividing a voltage drop that takes place when a predetermined current flows in the cell for a predetermined time by the current value. There is a relationship in which the internal resistance decreases as the temperature rises, and increases as the SOH decreases. Cell degradation progresses as a number of times of charging/discharging increases (cycle degradation). The cell degradation also depends on an individual difference and a usage environment. Thus, as a usage period becomes longer, variation in capacities of the plurality of cells V1 to V6 basically increases.

Controller 13 protects the plurality of cells V1 to V6 as the management of electricity storage module 20, by turning off first relay RY1 and/or second relay RY2 when an abnormality occurs in at least one of the plurality of cells V1 to V6.

Further, controller 13 performs an equalizing process of the plurality of cells V1 to V6 as the management of electricity storage module 20. The equalizing process by passive balancing is based on control that makes voltages/capacities of cells other than a cell having a lowest voltage/capacity among the plurality of cells V1 to V6 equal to the lowest voltage/capacity. Controller 13 determines discharge periods of the other cells to make the voltages/capacities of the other cells equal to the voltage/capacity of the cell having the lowest voltage/capacity. Controller 13 determines each discharge period of discharge circuits 11a to 11f based on a discharge capacity represented by a difference between the measured voltage/capacity of the other cell and a target voltage/target capacity for equalization, a resistance value of discharge resistor Ra to Rf, and a discharge rate. Generally, the voltage/capacity of the cell having the lowest voltage/capacity is set as the target voltage/target capacity for equalization. In the following description, the discharge rate is fixed.

Controller 13 controls ON/OFF of each discharge switch of the other cells based on the determined discharge periods. Specifically, controller 13 transmits control signals defining on/off timings of discharge switches Sa to Sf to voltage measurement unit 12, and voltage measurement unit 12 controls ON/OFF of each discharge switch Sa to Sf based on the received control signals. In a discharge circuit with the discharge switch in an on state, a current flows from the parallel-connected cell to the discharge resistor, and the voltage/capacity of the cell decreases.

In recent years, capacity of electricity storage module 20 has been increasing. Electricity storage module 20 having large capacity requires the discharge rate to be increased for shortening the equalization time. However, increase in the discharge rate would cause the heat generation of the plurality of discharge circuits 11a to 11f to increase, and also the temperature of the substrate on which the plurality of discharge circuits 11a to 11f are mounted to rise. Great rise in the substrate temperature shortens a life of the product. Meanwhile, use of high heat-resistant parts would increase a cost. Therefore, in the present exemplary embodiment, rise in the substrate temperature is suppressed by limiting a number of channels for simultaneous discharge during the equalizing process.

Figure 2A:
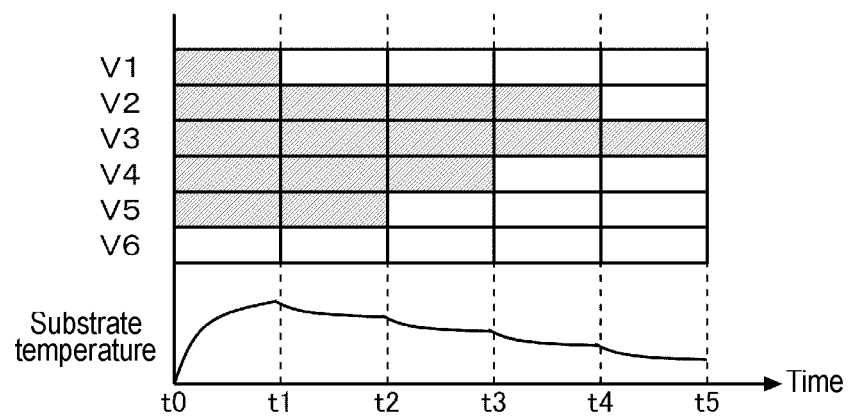
FIGS. 2(a) and 2(b) are diagrams for explaining equalizing discharge according to the first exemplary embodiment.
Figure 2B:
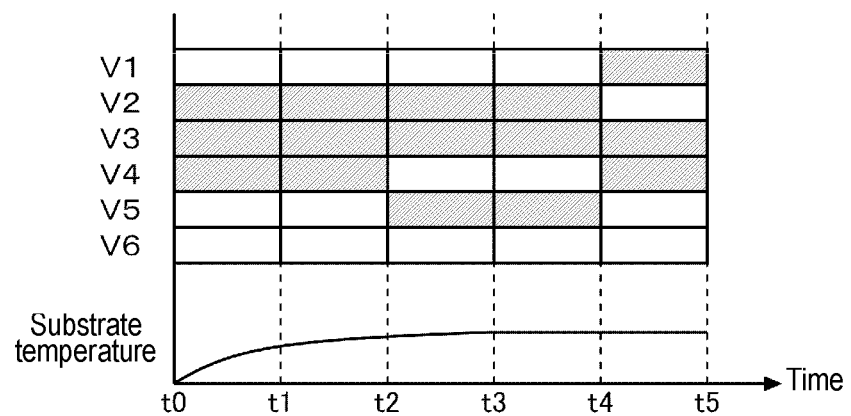

FIGS. 2(a) and 2(b) are diagrams for explaining equalizing discharge according to the first exemplary embodiment. Shaded blocks indicate that equalization discharge is being executed, and blank blocks indicate that equalizing discharge is suspended. FIG. 2(a) shows an exemplary discharge pattern during a general equalizing process, and FIG. 2(b) shows an exemplary discharge pattern during the equalizing process according to the present exemplary embodiment.

FIGS. 2(a) and 2(b) show an example in which voltages before a start of the equalizing process are higher in an order of third cell V3, second cell V2, fourth cell V4, fifth cell V5, first cell V1, and sixth cell V6. The voltage of sixth cell V6 having a lowest voltage is set as a target voltage for equalization. The discharge periods in the equalizing process are longer in an order of third cell V3, second cell V2, fourth cell V4, fifth cell V5, and first cell V1.

In the example shown in FIG. 2(a), third cell V3, second cell V2, fourth cell V4, fifth cell V5, and first cell V1 simultaneously start equalizing discharge.

The substrate temperature rises sharply due to the discharge in five channels. Discharging ends in an order of first cell V1, fifth cell V5, fourth cell V4, second cell V2, and third cell V3. As the number of channels for discharge at work decreases, the substrate temperature decreases.

In the example shown in FIG. 2(b), the number of channels for simultaneous discharge is limited to three. Channels for discharge are top three channels of which discharge period is long. At a start of the equalizing process, second cell V2, third cell V3, and fourth cell V4 are the top three channels. At time t2, the top three channels of which residual discharge period is long are second cell V2, third cell V3, and fifth cell V5. Accordingly, fourth cell V4 suspends discharging and fifth cell V5 starts discharging. At time t4, the equalizing discharge of second cell V2 and fourth cell V4 is completed. The top three channels of which residual discharge period is long are first cell V1, fourth cell V4, and fifth cell V5, and fourth cell V4 and fifth cell V5 start discharging. At time t5, the discharge in all channels ends.

As shown in FIG. 2(b), a peak of the substrate temperature can be reduced as compared with the discharge pattern shown in FIG. 2(a) with the discharge rate and the equalization time unchanged, by limiting the number of channels for simultaneous discharge to three, and appropriately scheduling the timings of the equalizing discharge executed by the respective cells.

Figure 3:
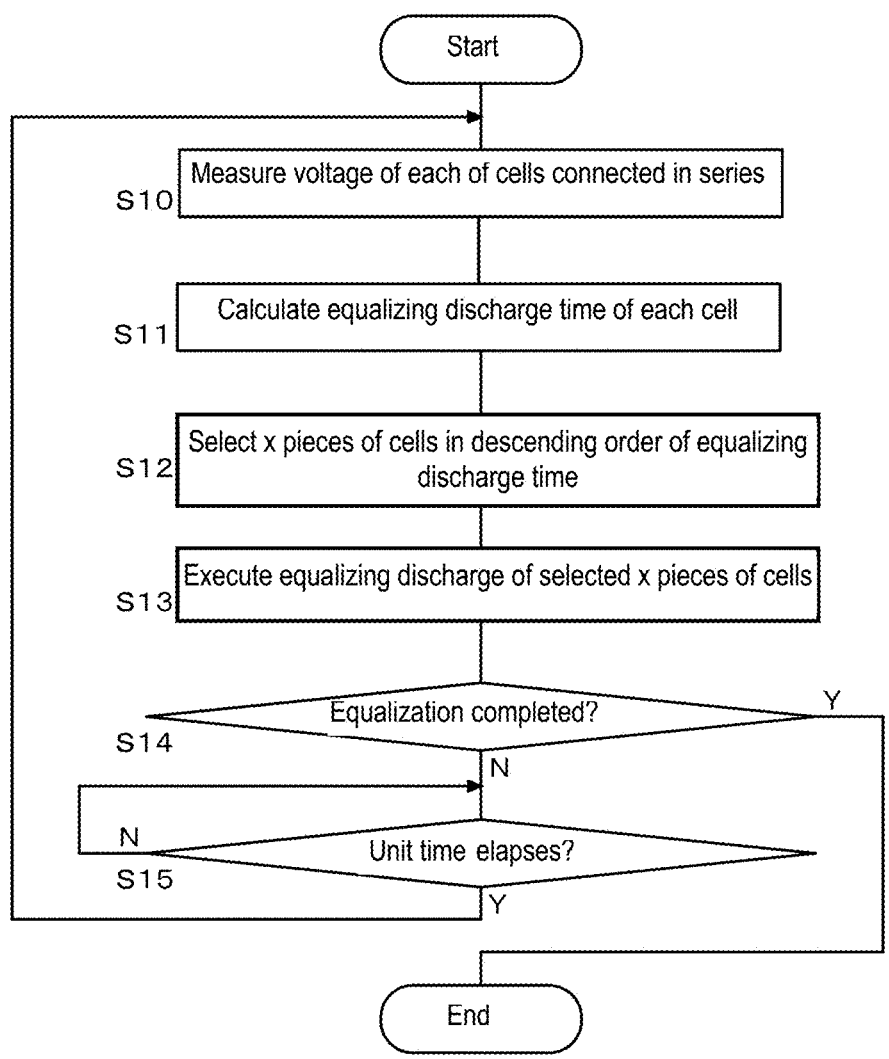
FIG. 3 is a flowchart showing a flow of an equalizing process according to the first exemplary embodiment of the present invention.

FIG. 3 is a flowchart showing a flow of the equalizing process according to the first exemplary embodiment of the present invention. Voltage measurement unit 12 measures voltages of the plurality of cells V1 to V6 connected in series (S10) to output the voltages to controller 13. Controller 13 calculates an equalizing discharge period of each cell V1 to V6 based on the voltages of the plurality of cells V1 to V6 acquired from voltage measurement unit 12 (S11). Controller 13 selects x pieces of cells in descending order of equalizing discharge period (S12). Note that controller 13 may select x pieces of cells in descending order of cell voltage.

In the first exemplary embodiment, number x is a fixed value and derived in advance by the designer based on an allowable temperature of the substrate, an expected ambient temperature, the resistance values of discharge circuits 11a to 11f, and the discharge rate. The allowable temperature of the substrate is set to a temperature corresponding to a performance guaranteed temperature of the substrate.

Controller 13 executes equalizing discharge of the selected x pieces of cells (S13). Specifically, controller 13 instructs voltage measurement unit 12 to turn on discharge switches of discharge circuits connected in parallel to the respective selected x pieces of cells. Voltage measurement unit 12 turns on the designated discharge switches in response to the instruction from controller 13.

Until the equalization of the plurality of cells V1 to V6 is completed (N in S14), the processing from step S10 to step S13 is repeated in a unit time interval (Y in S15). When the equalization of the plurality of cells V1 to V6 is completed (Y in S14), the equalizing process ends.

As described above, according to the first exemplary embodiment, it is possible to lower the peak temperature of the substrate by limiting the number of channels for simultaneous discharge in the equalizing process by the passive method. If the peak temperature of the substrate can be lowered, costs of the substrate and parts mounted on the substrate can be reduced. Further, reducing the discharge rate is unnecessary, which can suppress the increase in the equalization time as compared with a case where the heat generation is coped with by reducing the discharge rate.

The preferential discharge in top x channels of which discharge period is long (=cell voltage is high) allows for such control that a difference between a maximum voltage and a minimum voltage among the plurality of cells V1 to V6 is reduced during the equalizing process. Meanwhile, when a cell of which discharge period is short is discharged first, the difference between the maximum voltage and the minimum voltage among the plurality of cells V1 to V6 is not reduced during the discharge of the cell.

For example, if the vehicle does not perform the equalizing process during running, the equalizing process will be interrupted/ended at a start of running during the equalizing process. It is preferable that the equalizing process be interrupted/ended in a state where the difference between the maximum voltage and the minimum voltage among the plurality of cells V1 to V6 is as small as possible.

Next, a second exemplary embodiment will be described. In the second exemplary embodiment, the number of channels for simultaneous discharge is adaptively changed in accordance with the temperature of the substrate. Here, the number of channels is changed to a maximum number with the temperature of the substrate within a range of the allowable temperature at each time point.

Figure 4A:
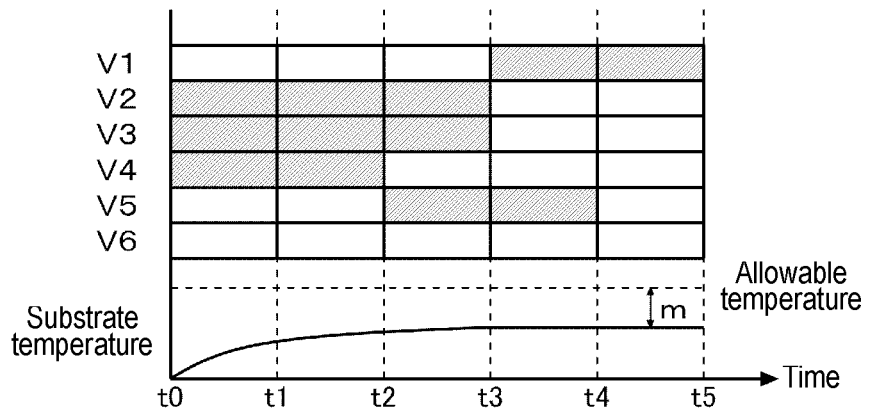
FIGS. 4(a) to 4(c) are diagrams for explaining equalizing discharge according to a second exemplary embodiment.
Figure 4B:
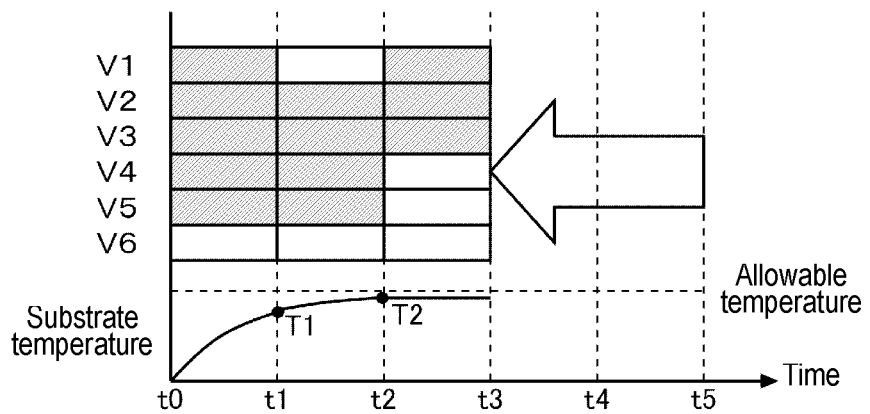
Figure 4C:
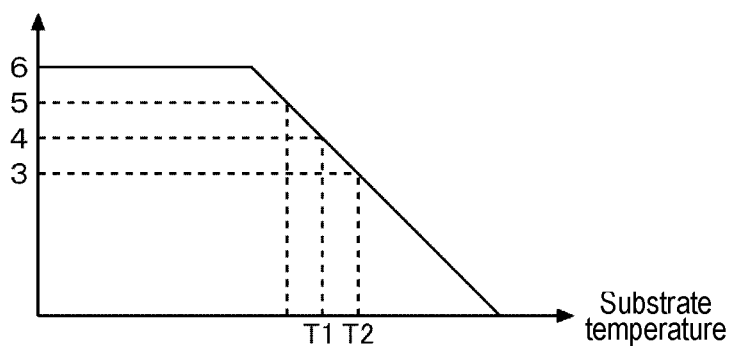

FIGS. 4(a) to 4(c) are diagrams for explaining equalizing discharge according to the second exemplary embodiment. FIG. 4(a) shows an exemplary discharge pattern when the number of channels for simultaneous discharge is fixed, and FIG. 4(b) shows an exemplary discharge pattern when the number of channels for simultaneous discharge is variable.

In the example shown in FIG. 4(a), the number of channels for simultaneous discharge is fixed to three. A peak temperature of the substrate is reduced and the temperature of the substrate is leveled by limiting the number of channels for simultaneous discharge as described in the first exemplary embodiment. In the example shown in FIG. 4(a), there is relatively large margin m between the allowable temperature of the substrate and the actual temperature of the substrate. This margin m appears when the ambient temperature is lower than an expected temperature. In this case, the equalization time can be shortened by increasing the number of channels for simultaneous discharge with the substrate temperature within a range of the allowable temperature.

In the example shown in FIG. 4(b), the number of channels for simultaneous discharge is five at a start of the equalizing discharge, reduced to four at time t1, and reduced to three at time t2. In FIG. 4(b), the equalizing process among the plurality of cells V1 to V6 is completed at time t3. Compared with the discharge pattern shown in FIG. 4(a), the equalization time is significantly shortened.

FIG. 4(c) is a graph showing a relationship between the substrate temperature and the number of channels for simultaneous discharge. As shown in FIG. 4(c), the higher the substrate temperature, the smaller the number of channels for simultaneous discharge. In the second exemplary embodiment, the non-volatile memory of controller 13 stores in advance a table or a function describing the relationship shown in FIG. 4(c). Controller 13 determines the number of channels for simultaneous discharge based on the table or function and the substrate temperature measured by temperature sensor T1.

Figure 5:
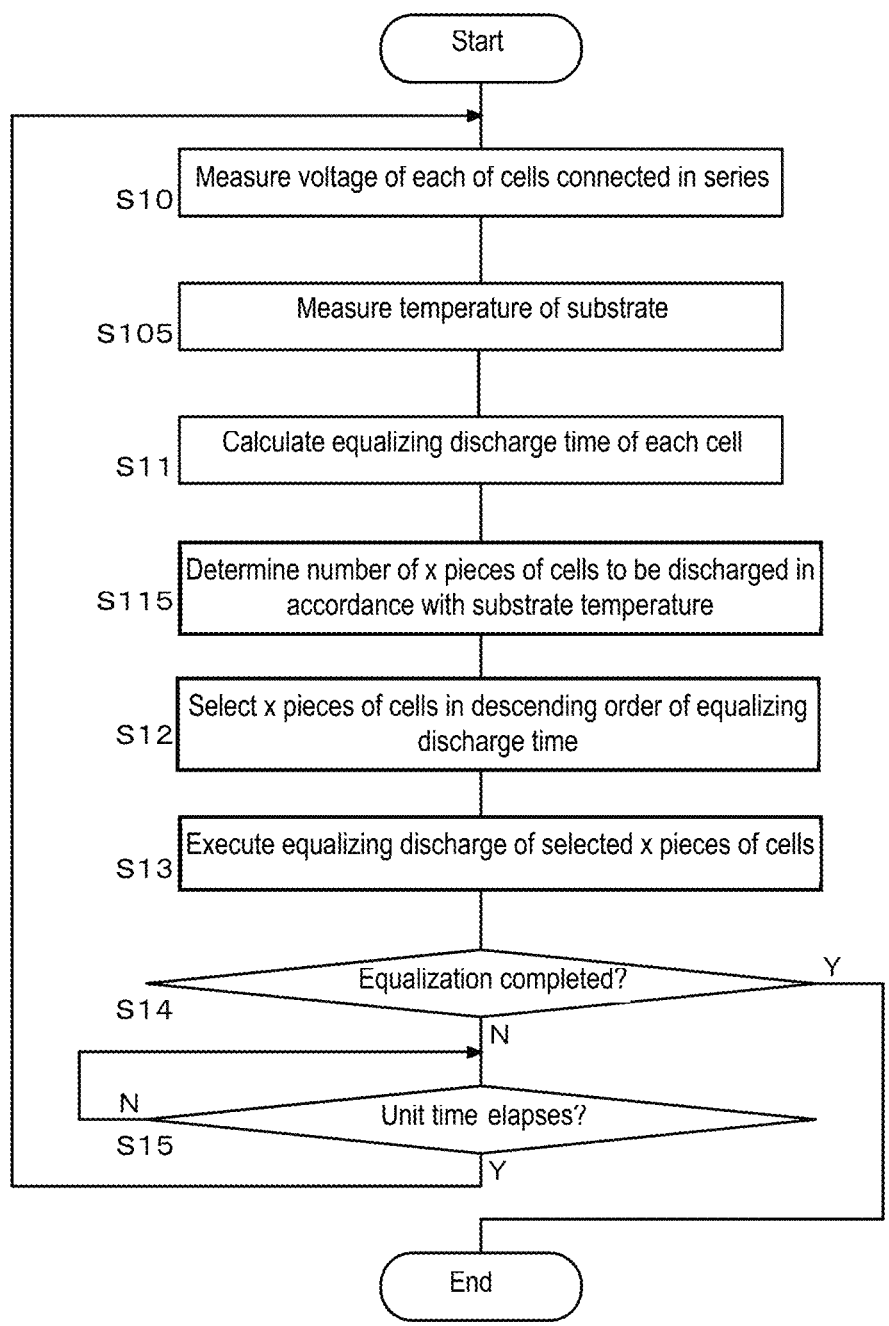
FIG. 5 is a flowchart showing a flow of an equalizing process according to the second exemplary embodiment of the present invention.

FIG. 5 is a flowchart showing a flow of the equalizing process according to the second exemplary embodiment of the present invention. Voltage measurement unit 12 measures voltages of the plurality of cells V1 to V6 connected in series (S10) to output the voltages to controller 13. Temperature sensor T1 measures a temperature of the substrate (S105) to output the temperature to controller 13. Controller 13 calculates an equalizing discharge period of each cell V1 to V6 based on the voltages of the plurality of cells V1 to V6 acquired from voltage measurement unit 12 (S11). Controller 13 determines a number of x pieces of cells to be discharged in accordance with the substrate temperature measured by temperature sensor T1 (S115). Controller 13 selects x pieces of cells in descending order of equalizing discharge period (S12).

Controller 13 executes equalizing discharge of the selected x cells (S13). Until the equalization of the plurality of cells V1 to V6 is completed (N in S14), the processing from step S10 to step S13 is repeated in a unit time interval (Y in S15). When the equalization of the plurality of cells V1 to V6 is completed (Y in S14), the equalizing process ends.

As described above, according to the second exemplary embodiment, in addition to the advantageous effects of the first exemplary embodiment, the equalization time can be shortened with the substrate temperature within the range of the allowable voltage, by optimizing the number of channels for simultaneous discharge.

Next, a third exemplary embodiment will be described. In the third exemplary embodiment, controller 13 basically sleeps during equalizing process, and periodically starts up (wakes up) to perform processing to determine a discharge period of each channel and a channel for discharge.

Controller 13 is supplied with power from an auxiliary battery (generally, a 12 V lead battery) and from electricity storage module 20. In the former case, when the vehicle is not running, it is required to reduce the power supply to controller 13 from a viewpoint of securing capacity of the auxiliary battery. In the latter case, it is required to prevent loss of cell balance due to the power consumption of controller 13 during the equalizing process. In either case, it is required to reduce the power consumption of controller 13 during the equalizing process.

Figure 6A:
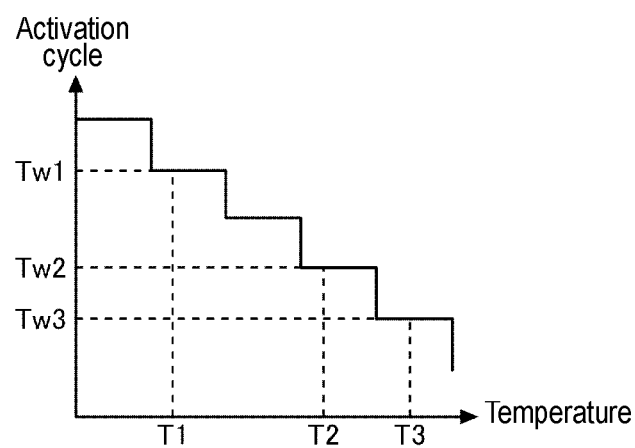
FIGS. 6(a) and 6(b) are diagrams for explaining an activation cycle of a controller according to a third exemplary embodiment.
Figure 6B:
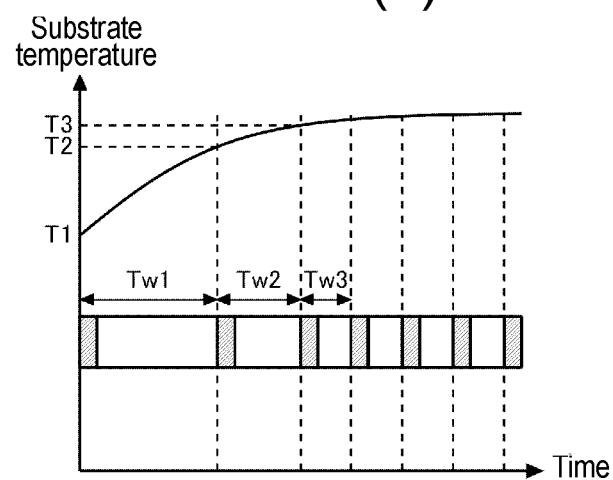

FIGS. 6(a) and 6(b) are diagrams for explaining an activation (=start up or wake up) cycle of controller 13 according to the third exemplary embodiment. FIG. 6(a) is a graph showing a relationship between the substrate temperature and the activation cycle of controller 13. As shown in FIG. 6(a), the activation cycle of controller 13 is set longer as the substrate temperature is lowered. Since a low substrate temperature means a high safety state, controller 13 sleeps for a long time for reducing the power consumption. Meanwhile, when the substrate temperature is high, the activation cycle is shortened and monitoring is enhanced such that the substrate temperature does not exceed an allowable temperature.

In the third exemplary embodiment, the non-volatile memory of controller 13 stores in advance a table or a function describing the relationship shown in FIG. 6(a). Controller 13 determines the activation cycle based on the table or function and the substrate temperature measured by temperature sensor T1.

FIG. 6(b) is a diagram showing an example of the activation cycle of controller 13 and temperature transition of the substrate. A shaded block in the activation cycle indicates an activation period, and a blank block indicates a sleep period. As the substrate temperature rises, the activation cycle of controller 13 becomes shorter.

Figure 7:
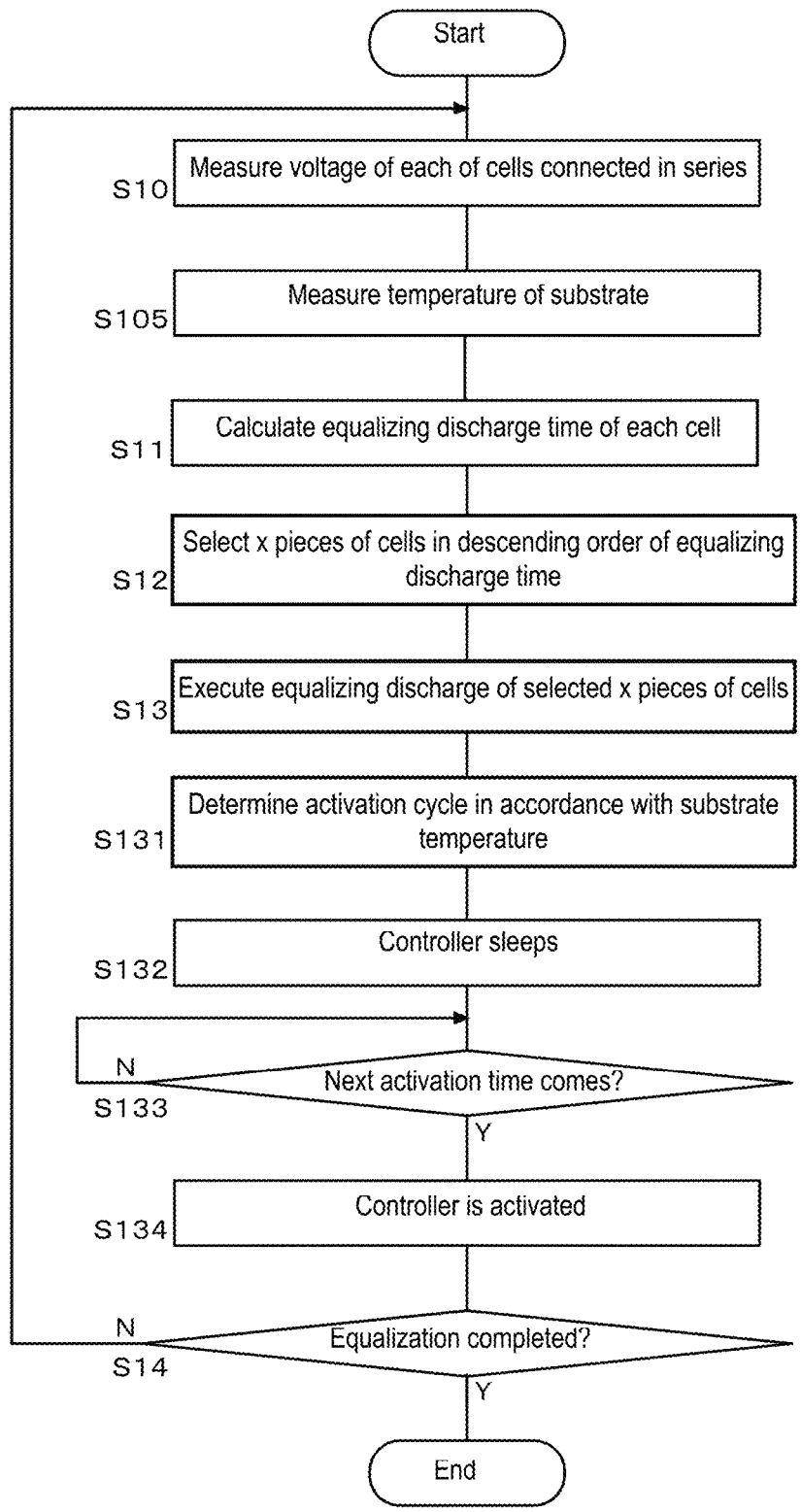
FIG. 7 is a flowchart showing a flow of an equalizing process according to the third exemplary embodiment of the present invention.

FIG. 7 is a flowchart showing a flow of the equalizing process according to the third exemplary embodiment of the present invention. Voltage measurement unit 12 measures voltages of the plurality of cells V1 to V6 connected in series (S10) to output the voltages to controller 13. Temperature sensor T1 measures a temperature of the substrate (S105) to output the temperature to controller 13. Controller 13 calculates an equalizing discharge period of each cell V1 to V6 based on the voltages of the plurality of cells V1 to V6 acquired from voltage measurement unit 12 (S11). Controller 13 selects x pieces of cells in descending order of equalizing discharge period (S12).

Controller 13 executes equalizing discharge of the selected x cells (S13). Controller 13 determines an activation cycle in accordance with the substrate temperature measured by temperature sensor T1 (S131). Specifically, controller 13 specifies next activation time or sleep duration to the next activation time. Controller 13 sets a timer to sleep (S132).

When the next activation time comes (Y in S133) or the sleep duration elapses, controller 13 is activated (S134). When the equalization of the plurality of cells V1 to V6 is not completed (N in S14), the processing from step S10 to step S134 is repeated. When the equalization of the plurality of cells V1 to V6 is completed (Y in S14), the equalizing process ends.

As described above, according to the third exemplary embodiment, in addition to the advantageous effects of the first exemplary embodiment, the power consumption of controller 13 can be reduced with the substrate temperature within the range of the allowable voltage, by optimizing the activation cycle of controller 13. The control according to the third exemplary embodiment and the control according to the second exemplary embodiment may be performed together.

The present invention has been described above based on the exemplary embodiments. The exemplary embodiments are examples, and it will be understood by the person of ordinary skill in the art that combinations of respective configuration elements and respective processing processes of the exemplary embodiments can be variously modified, and such modified examples are also within the scope of the present invention.

Figure 8:
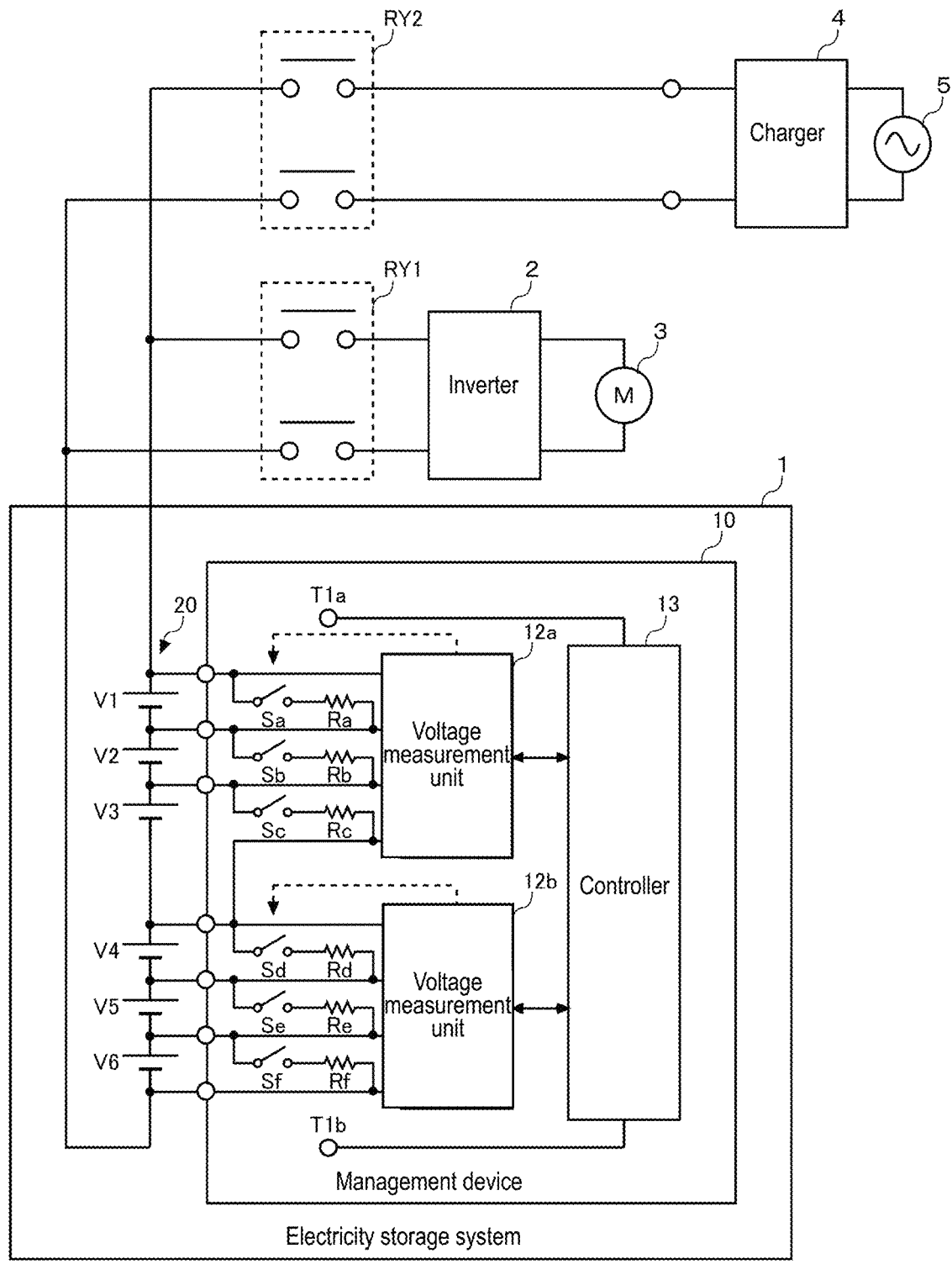
FIG. 8 is a diagram for explaining an electricity storage system according to a modified example.

FIG. 8 is a diagram for explaining electricity storage system 1 according to a modified example. In the modified example, a plurality of discharge circuits 11a to 11f are divided into a plurality of groups, and the control described in the above first to third exemplary embodiments is performed in each group. In the example shown in FIG. 8, each group includes voltage measurement unit 12 and temperature sensor T1. A plurality of cells V1 to V3, a plurality of discharge circuits 11a to 11c, temperature sensor T1a, and voltage measurement unit 12a belong to group A. A plurality of cells V4 to V6, a plurality of discharge circuits 11d to 11f, temperature sensor T1b, and voltage measurement unit 12b belong to group B. Controller 13 is common. When a number of series connections of the plurality of cells is large, a plurality of voltage measurement units 12 are often included.

It is also possible to divide a plurality of cells managed by one voltage measurement unit 12 into a plurality of groups for control. For example, voltage measurement unit 12 may separately manage a group of odd-numbered cells and a group of even-numbered cells.

The above second and third exemplary embodiments have described an example using the substrate temperature measured by temperature sensor T1 as a parameter when the number of channels for simultaneous discharge/the activation cycle of controller 13 is derived. In this respect, a difference value between an allowable temperature of the substrate and the substrate temperature may be used instead of the measured substrate temperature itself. Further, a ratio may be used, defining a difference between the allowable temperature of the substrate and an initially measured temperature as 100%.

The above exemplary embodiments have described an example in which the above equalizing process is used in electricity storage system 1 for vehicle applications, but the above equalizing process can also be used in electricity storage system 1 for stationary electricity storage applications. The above equalizing process can also be used in electricity storage system 1 for electronic device applications such as notebook PCs and smartphones.

The exemplary embodiments may be specified by the following items.

[Item 1]

Management device (10) including:

voltage measurement unit (12) configured to measure voltages of a plurality of cells (V1 to V6) connected in series;

a plurality of discharge circuits (11a to 11f each connected in parallel to each of the plurality of cells (V1 to V6); and controller (13) configured to control, based on the voltages of the plurality of cells (V1 to V6) detected by voltage measurement unit (12), the plurality of discharge circuits (11a to 11f to make the voltages or capacities of the plurality of cells (V1 to V6) equal to a target value, wherein controller (13) is configured to determine a number of cells to be discharged among the plurality of cells (V1 to V6) in accordance with an allowable temperature of a substrate having the plurality of discharge circuits (11a to 11f.

According to this, it is possible to lower a peak temperature of the substrate while suppressing an increase in equalization time in the equalizing process among the plurality of cells (V1 to V6).

[Item 2]

Management device (10) according to item 1, wherein controller (13) is configured to make a maximum number of cells discharge with a temperature of the substrate within a range of the allowable temperature.

According to this, the equalization time can be shortened with the temperature of the substrate within the range of the allowable temperature.

[Item 3]

Management device (10) according to item 1 or 2, wherein controller (13) is configured to make the determined number of cells discharge in descending order of voltage among the plurality of cells (V1 to V6).

According to this, a difference between a maximum voltage and a minimum voltage among the plurality of cells (V1 to V6) can be reduced over an entire period of the equalizing process.

[Item 4]

Management device (10) according to any one of items 1 to 3, wherein controller (13) is configured to adaptively change the number of cells to be discharged in accordance with a temperature of the substrate.

According to this, the equalization time can be further shortened with the temperature of the substrate within the range of the allowable temperature.

[Item 5]

Management device (10) according to any one of items 1 to 4, wherein controller (13) is configured to be activated periodically to control the plurality of discharge circuits (11a to 11f, and controller (13) is configured to shorten an activation interval as a temperature of the substrate increases.

According to this, it is possible to reduce power consumption of controller (13) while ensuring safety.

[Item 6]

Electricity storage system (1) including:

a plurality of cells (V1 to V6) connected in series; and management device (10) according to any one of items 1 to 5 configured to manage the plurality of cells (V1 to V6).

According to this, it is possible to construct electricity storage system (1) that can lower a peak temperature of the substrate while suppressing an increase in equalization time in the equalizing process among the plurality of cells (V1 to V6).

REFERENCE MARKS IN THE DRAWINGS 1 electricity storage system
2 inverter
3 motor
4 charger
5 system
10 management device
11a-11f discharge circuit
12 voltage measurement unit
13 controller
V1-V6 cell
RY1 first relay
RY2 second relay
T1 temperature sensor
20 electricity storage module

The invention claimed is:
1. A management device comprising:
a voltage measurement unit configured to measure each of voltages of a plurality of cells connected in series;
a plurality of discharge circuits each connected in parallel to each of the plurality of cells; and
a controller configured to control, based on the voltages of the plurality of cells detected by the voltage measurement unit, the plurality of discharge circuits to make the voltages or capacities of the plurality of cells equal to a target value,
wherein the controller is configured to determine a number of cells to be discharged among the plurality of cells in accordance with an allowable temperature of a substrate having the plurality of discharge circuits,
wherein the controller is configured to make the determined number of cells discharge in descending order of voltage among the plurality of cells,
wherein the controller is configured to adaptively change the number of cells to be discharged in accordance with a temperature of the substrate.

2. The management device according to claim 1, wherein the controller is configured to make a maximum number of cells discharge with a temperature of the substrate within a range of the allowable temperature.

3. The management device according to claim 1, wherein the controller is configured to be activated periodically to control the plurality of discharge circuits, and
the controller is configured to shorten an activation interval as a temperature of the substrate increases.

4. An electricity storage system comprising:
a plurality of cells connected in series; and
the management device according to claim 1 configured to manage the plurality of cells.

* * * * *